(12) United States Patent
Srinivasan et al.

(10) Patent No.: US 10,102,191 B2
(45) Date of Patent: Oct. 16, 2018

(54) PROPAGATION OF CHANGES IN MASTER CONTENT TO VARIANT CONTENT

(71) Applicant: ADOBE SYSTEMS INCORPORATED, San Jose, CA (US)

(72) Inventors: Balaji Vasan Srinivasan, Bangaore (IN); Natwar Modani, Bengaluru (IN); Gaurush Hiranandani, Bengaluru (IN); Harsh Jhamtani, Kanpur (IN); Cedric Huesler, San Francisco, CA (US); Sanket Vaibhav Mehta, Bengaluru (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 0 days.

(21) Appl. No.: 15/184,959

(22) Filed: Jun. 16, 2016

(65) Prior Publication Data

US 2017/0364495 A1    Dec. 21, 2017

(51) Int. Cl.
*G06F 17/22* (2006.01)
*G06F 17/24* (2006.01)
*G06F 17/27* (2006.01)
*G06K 9/00* (2006.01)
*G06F 3/0484* (2013.01)
*G06F 3/0482* (2013.01)

(52) U.S. Cl.
CPC ........ *G06F 17/2288* (2013.01); *G06F 3/0482* (2013.01); *G06F 3/0484* (2013.01); *G06F 17/24* (2013.01); *G06F 17/2765* (2013.01); *G06K 9/00483* (2013.01)

(58) Field of Classification Search
CPC ......................................... G06F 17/20–17/289
See application file for complete search history.

(56) References Cited

U.S. PATENT DOCUMENTS 9,372,858 B1 *   6/2016   Vagell ............... G06F 17/30011
2006/0064634 A1 * 3/2006   Dettinger ............ G06F 17/2211
                                                            715/255

(Continued)

OTHER PUBLICATIONS

Gonzalo Navarro. 2001. A guided tour to approximate string matching. ACM Comput. Surv. 33,Mar. 1, 2001, 31-88. DOI=http://dx.doi.org/10.1145/375360.375365.

(Continued)

*Primary Examiner* — Keith D Bloomquist
(74) *Attorney, Agent, or Firm* — Shook, Hardy & Bacon LLP

(57) ABSTRACT

A method for propagating changes from master content to variant content includes receiving, from a user interface, a modified master text composition that incorporates changes to a master text composition. Each of the master text composition, the modified master text composition, and a variant text composition assigned to the master text composition are divided into text units. A correspondence model is constructed that includes mappings between the text units of the master text composition, the text units of the modified master text composition, and the text units of the variant text composition. Proposed changes to the variant text composition are determined that correspond to the changes to the master text composition based on the mappings. At least one of the proposed changes is integrated into the variant text composition.

20 Claims, 7 Drawing Sheets

(56) References Cited

U.S. PATENT DOCUMENTS

2008/0300864 A1* 12/2008 Smith ................... G06F 17/227
                                                              704/9
2011/0029482 A1*  2/2011 Gimson ............. G06F 17/3061
                                                            707/624
2013/0013604 A1*  1/2013 Kobayasi ............ G06F 17/2211
                                                            707/737

OTHER PUBLICATIONS

Hopcroft, J. E., & Karp, R. M. (1973). An n^5/2 algorithm for maximum matchings in bipartite graphs. SIAM Journal on computing, 2(4), 225-231. DOI=http://dx.doi.org/10.1137/0202019.

* cited by examiner

| Master 242A | Variant 248A | Master_new 232A | Suggested changes |
|---|---|---|---|
| Students and teachers: Get 60% off Creative Cloud Introductory Pricing Terms and Conditions $19.99/month Creative Cloud Introductory Pricing Save 60% Eligible students 13 and older and teachers can purchase an annual membership to Adobe Creative Cloud for a reduced price of $19.99/month for the first year. After the first year we will renew your contract automatically for another year at the then-current standard monthly price (currently at $29.99/month), unless you cancel. This pricing is valid for purchases of an annual plan, which requires a 12-month contract. This pricing is available to first time membership only and limited to eligible education customers who purchase directly from the Adobe Store or by calling Adobe Sales. This pricing is not available to OEM, commercial or volume licensing customers. This pricing is limited to one (1) purchase of one (1) Creative Cloud annual membership per customer. Offer may not be assigned, exchanged, sold, transferred, or combined with any other discount or offer, or redeemed for cash or other goods and services. | Students and teachers: Get 60% off Creative Cloud Introductory Pricing Terms and Conditions $19.99/month Creative Cloud Introductory Pricing Save 60% Eligible students 13 and older and teachers can purchase an annual membership to Adobe Creative Cloud for a reduced price of $19.99/month for the first year. This pricing is available for first time membership only and limited to eligible education customers who purchase directly from the Adobe Store or by calling Adobe Sales. | Students and teachers: Get 60% off Creative Cloud Introductory Pricing Terms and Conditions $29.99/month Creative Cloud Introductory Pricing Save 60% Eligible students 13 and older and teachers can purchase an annual membership to Adobe Creative Cloud for a reduced price of $19.99/month for the first year. After the first year we will not renew your contract automatically for another year at the then-current standard monthly price (currently at $29.99/month), unless you cancel. This pricing is valid for purchases of an annual plan, which requires a 12-month contract. This pricing is available only for first time membership and limited to eligible education customers who purchase directly from the Adobe Store or by calling Adobe Sales. This pricing is not available to OEM, commercial or volume licensing customers. Offer may not be assigned, exchanged, sold, transferred, or combined with any other discount or offer, or redeemed for cash or other goods and services. | Students and teachers: Get 60% off Creative Cloud Introductory Pricing Terms and Conditions Save 60% Eligible students 13 and older and teachers can purchase an annual membership to Adobe Creative Cloud for a reduced price of $19.99/month for the first year. This pricing is available for first time membership <del>only</del> and limited to eligible education customers who purchase directly from the Adobe Store or by calling Adobe Sales. |

FIG. 2A

| Master 242B | Variant 248B | Master_new 232B | Suggested changes |
|---|---|---|---|
| *Capture color combinations whenever inspiration strikes with Adobe Color CC and your iPhone or iPad. Your color themes are automatically saved to Creative Cloud Libraries for access in desktop and mobile apps, or to share with your team. You can also sync your themes to Adobe Color service. Color generates themes you can use in Adobe desktop apps like Photoshop and Illustrator, and new Adobe mobile apps like Illustrator Line, Illustrator Draw, and Photoshop Sketch. To Create color themes All you need is your iPhone or iPad or any existing image to capture and create color themes.* Creative Cloud Libraries Color *themes are automatically saved to Creative Cloud Libraries so they're accessible in Adobe apps. You can also share Libraries with your team directly from the app.* | Capture color combinations whenever inspiration strikes with Adobe Color CC and your iPhone or iPad. Your color themes are automatically saved to Creative Cloud Libraries for access in desktop and mobile apps, or to share with your team. You can also sync your themes to Adobe Color service. Color generates themes you can use in Adobe desktop apps like Photoshop and Illustrator, and new Adobe mobile apps like Illustrator Line, Illustrator Draw, and Photoshop Sketch. To Create color themes All you need is your iPhone or iPad or any existing image to capture and create color themes. | Capture color combinations whenever inspiration strikes with Adobe Color CC and your iPhone or iPad. Your color themes are synced to Creative Cloud Libraries for access in desktop and mobile apps, or to share with your team. You can sync your themes to Adobe Color service as well. Color generates themes that you can use in Adobe desktop apps like Photoshop and Illustrator, and new Adobe mobile apps like Illustrator Line, Illustrator Draw, Photoshop Elements and Photoshop Sketch. | Capture color combinations whenever inspiration strikes with Adobe Color CC and your iPhone or iPad. Your color themes are <mod>synced</mod> <del>saved</del> to Creative Cloud Libraries for access in desktop and mobile apps, or to share with your team. <del>You can also sync your themes to Adobe Color service.</del> Color generates themes that you can use in Adobe desktop apps like Photoshop and Illustrator, and new Adobe mobile apps like Illustrator Line, Illustrator Draw, and Photoshop Sketch. <del>To Create color themes All you need is your iPhone or iPad or any existing image to capture and create color themes.</del> |

FIG. 2B

PROPAGATION OF CHANGES IN MASTER CONTENT TO VARIANT CONTENT

BACKGROUND

Digital content management systems allow content authors to create different variants, or versions, of the same content. Content authors can assign different variants of the content to different computing contexts so that when a device requests the content, the appropriate version is automatically selected for transmission to the device (e.g., on a web site). This allows content authors to tailor content to users or devices while being compatible with computer transmission infrastructure. For example, a shorter version of content is often suitable for mobile devices, which typically have small displays that fit less information than desktop displays and are typically more difficult to read.

Digital content management systems, such as Adobe® Experience Manager, allow users to maintain master content (e.g., a text composition). A user can use the master content as a common starting point to generate many variants from the master content (e.g., summaries or other variations to the master content). When a user modifies master content, they may also desire to make similar changes to variant content. Conventional digital content management systems are incapable of translating those changes to associated variant content. Conventional version management technology allows computers to identify insertions or deletions that can be applied to one version of content to reach another version of content. However, such version management technology lacks the ability to identify changes to be applied to a version of content based on changes made to a different version of content. Thus, computing systems are unable to propagate changes made to master content to each of its variants.

SUMMARY

This summary is provided to introduce a selection of concepts in a simplified form that are further described below in the Detailed Description.

The present application provides a technology for propagating changes made to master content to variant content. Changes made to the text of a master text composition result in a modified master text composition. To propagate the changes to a variant text composition, the master text composition, the modified master text composition, and the variant text composition are divided into text units. Each text unit may comprise a sentence of its associated text composition. A correspondence model is generated from the text units, which indicates which text units from the different text compositions correspond to one another based on an analysis of how similar those text units are to one another.

Sufficiently similar text units from the master text composition and the modified master text composition are mapped together and compared to detect changes. Sufficiently similar text units from the master text composition and the variant text composition are also mapped together. When a change is detected for a text unit from the master text composition, it is compared to the text unit it is mapped to in the variant text composition to generate proposed changes that correspond to the detected change. This can include comparing the text of the corresponding text units from the different text compositions to determine how to propagate the detected change. Thus, the correspondence model provides a framework for detecting changes to master content, and for generating proposed changes in variant content that propagate the detected changes. These and other concepts are contemplated as being within the scope of the present disclosure.

BRIEF DESCRIPTION OF THE DRAWINGS

The present invention is described in detail below with reference to the attached drawing figures, wherein:

FIG. 2A shows an example of a display comprising proposed changes to a variant text composition in accordance with embodiments of the present disclosure;

FIG. 2B shows an example of a display comprising proposed changes to a variant text composition in accordance with embodiments of the present disclosure;

DETAILED DESCRIPTION

Figure 1:
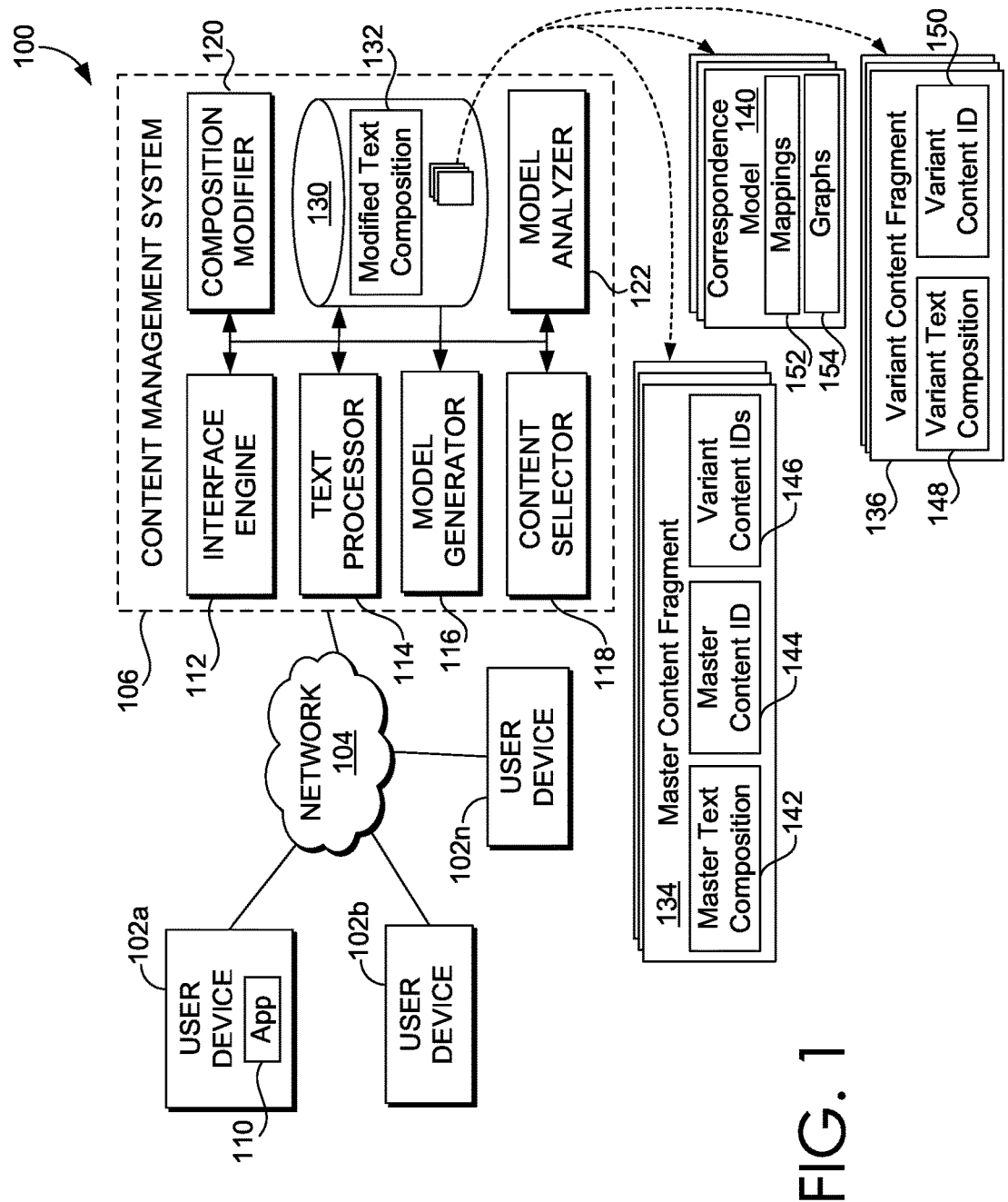
FIG. 1 shows a block diagram showing an example of an operating environment in accordance with embodiments of the present disclosure.

The subject matter of the present invention is described with specificity herein to meet statutory requirements. However, the description itself is not intended to limit the scope of this patent. Moreover, although the terms "step" and/or "block" may be used herein to connote different elements of methods employed, the terms should not be interpreted as implying any particular order among or between various steps herein disclosed unless and except when the order of individual steps is explicitly described.

The present application provides a technology for propagating changes made to master content to variant content. Digital content management systems, such as Adobe® Experience Manager, allow users to maintain a master text composition, which a user can use as a common starting point to generate many variants. Examples of variants include summaries, linguistic adaptations, truncations, or rearrangements of the master text composition.

When a user modifies a master text composition, they may also desire to make similar changes to variant content. Conventional digital content management systems are incapable of translating those changes to associated variant content. Conventional version management technology allows computers to identify insertions or deletions that can be applied to one version of content to reach another version of content. However, such version management technology lacks the ability to identify changes to be applied to a version of content based on changes made to a different version of content.

Thus, typically when a user changes text in a master text composition, they must also manually determine and implement changes in each variant text composition as computing systems are unable to propagate changes made to master content to each of its variants. In the context of delivering digital content to user devices using these variants, time may be of the essence in performing this task. For example, the information conveyed in the text may need to be urgently updated across many potential variant contents due to inaccuracies, staleness, or for other reasons. Aspects of the present disclosure provide computing systems with many advantages, some of which include the ability to meet these requirements.

In some respects, present disclosure provides for a correspondence model that provides a framework for detecting changes to master content, and for generating proposed changes in variant content that propagate the detected changes. Changes made to the text of a master text composition result in a modified master text composition. To propagate the changes to a variant text composition, the master text composition, the modified master text composition, and the variant text composition are divided into text units. Each text unit may comprise a sentence of its associated text composition. A correspondence model is generated from the text units, which indicates which text units from the different text compositions correspond to one another based on an analysis of how similar those text units are to one another.

A correspondence model is generated from the text units, which indicates which text units from the different text compositions correspond to one another based on an analysis of how similar those text units are to one another. In some implementations, the correspondence model includes a correspondence graph that is a bipartite graph which uses text units from the master text composition as one set of nodes and text units from the modified master text composition as another set of nodes. Each node (text unit) from each set is connected to each node (text unit) from the other set by an edge. Edges in the graph are weighted by a calculated similarity score between the text units of the nodes. A similar correspondence graph is constructed using text units from the master text composition as one set of nodes and text units from the variant text composition as another set of nodes.

In further respects, the present application provides for calculating similarity scores, which may be used to weight the edges in correspondence graphs. In some cases, a similarity score factors in semantic similarities (e.g., similarities in meaning), between text units (e.g., nodes) in addition to differences in the characters of the text units. This can include comparing the meanings of words between the text units to determine amounts of differences in meaning.

In one approach, an edit distance function is used to quantify how similar two text units are to one another by determining (e.g., counting) the number of operations (e.g., minimum number of operations) required to transform one string into the other and associating a cost with each operation. To determine an overall distance, the costs for each operation are combined (e.g., summed), with each cost corresponding to a difference between text units, and therefore reducing similarity score between the text units. In contrast to typical edit distance functions, multiple characters, such as words, are used as the fundamental units of comparison. In some cases, semantic similarity between words is factored into the cost of the replace or update operation of the edit distance function (e.g., replacing one word with another between text units).

In further respects, a similarity score can factor in semantics of words that are added or removed between text units (e.g., nodes). For example, different words can have different levels of impact on the similarity score. Words that tend to occur more frequently in text may have a lower impact on the score than less frequent words. Additionally, the part-of-speech of the word may impact the score. In some approaches, the impact corresponds to a cost in the edit distance function and is associated with an add operation or a remove operation (e.g., adding or removing one word between text units).

The similarity scores of the correspondence model are analyzed to determine which text units are most similar between the text units. The most similar text units from the master text composition and the modified master text composition are mapped together and analyzed for changes. Similarly, the most similar text units from the master text composition and the variant text composition are mapped together.

Using approaches described herein, the identification of changes to master text compositions can be performed in a computationally efficient manner, thereby preserving processing power and allowing the system to quickly detect changes to many potential master contents and associated variant contents available to the system. For example, in detecting a change to a portion of a master text composition, the system only needs to compare and process the text of the text unit that includes that portion with respect to the text of the text unit that is mapped to that text unit in the modified master text composition. Using alternative approaches, such as a recursive approach to change identification can require extensive processing where each text composition may need to be comprehensively analyzed for each potential change.

When changes are detected for a text unit from the master text composition, they may be categorized by change type, such as an addition, deletion, or replacement of characters within a text unit, or a reordering of the text unit in a text composition. The text unit it is mapped to in the variant text composition is analyzed to generate proposed changes that correspond to the detected change. For each detected change, a proposed change may be generated in the text unit of the variant text composition. This can include comparing the text of the corresponding text units from the different text compositions based on the category of the change to determine how to propagate the detected change. Thus, the correspondence model provides a framework for detecting changes to master content, and for generating proposed changes in variant content that propagate the detected changes.

At least some proposed changes generated for a variant text composition can be displayed to the user. The user may accept, reject, or modify one to all of the displayed proposed changes and accepted or modified proposed changes are applied to the variant text composition. Also, at least some proposed changes may be automatically incorporated into a variant text composition. The modified variant text composition can be saved in place of the variant text composition.

Using approaches described herein, users are able to quickly and accurately propagate changes from master content to variant content. In the context of delivering digital content to user devices, time may be of the essence in performing this task. For example, the information conveyed in the text may need to be urgently updated across many potential variant contents due to inaccuracies, staleness, or for other reasons. Aspects of the present disclosure provide computing systems the ability to meet these requirements.

Turning now to FIG. 1, a block diagram is provided showing an example of an operating environment in which some implementations of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, operating environment 100 includes a number of user devices, such as user devices 102a and 102b through 102n, network 104, and content management system 106. Content management system 106 includes interface engine 112, text processor 114, model generator 116, content selector 118, composition modifier 120, model analyzer 122, and storage 130.

It should be understood that operating environment 100 shown in FIG. 1 is an example of one suitable operating environment. Each of the components shown in FIG. 1 may be implemented via any type of computing device, such as one or more of computing device 600, described in connection to FIG. 6, for example. These components may communicate with each other via network 104, which may be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks, such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 104 is not described in significant detail.

It should be understood that any number of user devices, servers, and data sources may be employed within operating environment 100 within the scope of the present disclosure. Each may comprise a single device or multiple devices cooperating in a distributed environment. For instance, content management system 106 may be provided via multiple devices arranged in a distributed environment that collectively provide the functionality described herein. Additionally, other components not shown may also be included within the distributed environment. In some cases, functionality of content management system 106 can be integrated, at least partially, into a user device, such as user device 102a. Furthermore, content management system 106 may at least partially be a cloud computing service.

User devices 102a through 102n can be client devices on a client-side of operating environment 100, while content management system 106 can be on a server-side of operating environment 100. Content management system 106 can comprise server-side software designed to work in conjunction with client-side software on user devices 102a through 102n so as to implement any combination of the features and functionalities discussed in the present disclosure. An example of such client-side software is application 110 on user device 102a. Each other device shown may include a similar application, with similar functionality. This division of operating environment 100 is provided to illustrate one example of a suitable environment, and it is noted there is no requirement for each implementation that any combination of content management system 106 and user devices 102a through 102n to remain as separate entities.

User devices 102a through 102n comprise any type of computing device capable of being operated by a user. In some implementations, user devices 102a through 102n are the type of computing devices described in relation to FIG. 6 herein. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user devices include one or more processors, and one or more computer-readable media. The computer-readable media includes computer-readable instructions executable by the one or more processors. The instructions may implement one or more applications, such as application 110 shown in FIG. 1. Application 110 is referred to as a single application for simplicity, but its functionality can be embodied by one or more applications in practice. As indicated above, the other user devices can include one or more applications similar to application 110.

The application(s) may generally be any application capable of providing changes to master text compositions to content management system 106, as will later be described in additional detail. It is contemplated herein that "application" be interpreted broadly. As one example, an application can be installed on an operating system of a user device. As another example, an application can be a service integrated into an operating system of a user device. In various implementations, an application can be on a user device, as shown with respect to application 110, but can at least partially be hosted server-side (e.g., on content management system 106).

Content management system 106 includes one or more processors, and one or more computer-readable media. The computer-readable media includes computer-readable instructions executable by the one or more processors. The instructions may implement one or more of interface engine 112, text processor 114, model generator 116, content selector 118, composition modifier 120, and model analyzer 122 shown in FIG. 1.

Storage 130 can comprise the computer-readable media and is configured to store computer instructions (e.g., software program instructions, routines, or services), data, and/or models used in embodiments described herein. In some implementations, storage 130 stores information or data received via the various components of content management system 106 and provides the various components with access to that information or data, as needed. In implementations, storage 130 comprises a data store (or computer data memory). Although depicted as a single component, storage 130 may be embodied as one or more data stores and may be in the cloud. Further, the information in storage 130 may be distributed in any suitable manner across one or more data stores for storage (which may be hosted externally).

Interface engine 112 is configured to interface content management system 106 with user devices, such as user devices 102a and 102b through 102n, for example, over network 104. Interface engine 112 can receive one or more network communications from user devices (e.g., from application 110), and provide one or more network communications to the user devices (e.g., to application 110). Interface engine 112 can communicate with one or more user devices, as needed, to carry out various implementations of the present disclosure.

In some implementations, a user is able to interact with content management system 106, for example, using a user interface of application 110, in order to provide one or more master text compositions to content management system 106. As shown, content management system 106 includes many master text compositions in storage 130, such as master text composition 142. A user can also interact with content management system 106, for example, using the user interface of application 110, in order to provide one or more variant text compositions to content management system 106. As shown, content management system 106 includes many variant text compositions in storage 130, such as variant text composition 148.

As used herein, a text composition includes computer text organized in a prearranged manner. As one example, the user may provide a text composition to interface engine 112 as a complete composition. As another example, the user may compose the text composition over interface engine 112, such as using a word processing application. Further, a user may be permitted to use a word processing application to modify an existing text composition.

As used herein, a master content fragment refers to a data object that represents a master text composition. As shown, each master text composition may be assigned to a master content fragment. For example, master text composition 142 is assigned to master content fragment 134. In some cases, the user may indicate that a preexisting text composition (e.g., previously constructed and persistently stored) is a master text composition, causing the text composition to be assigned to a master content fragment. In other cases, the master text composition is initially constructed and persistently stored as a master content fragment.

As shown, a master content fragment typically includes a single master text composition. A master content fragment can also include a master content identifier (ID), such as master content ID 144. The master content ID (e.g., a universally unique identifier UUID) identifies the master content fragment with respect to other master content fragments within content management system 106.

Content management system 106 can assign any number of variant text compositions to a master text composition. Each variant text composition was typically generated from the master text composition to which it is assigned. For example, in some implementations, content management system 106 receives a request from a user (e.g., via application 110) to create a new variant text composition from a master text composition specified by the request (e.g., by master content ID). In response, content management system 106 can optionally provide the user with the master text composition (e.g., via application 110). The master text composition may be displayed on the user device where the user can change the text thereof and save the modified text as a variant text composition of the master text composition. As another example, content management system 106 may automatically modify a master text composition to create one or more variant text compositions (e.g., using text modification algorithms) Examples of modifications that may be made automatically and/or by a user include summarization, truncation, reordering of sentences, and linguistic adaptation. Examples of linguistic adaptation includes customizing words to a particular audience, such as based on their demographic information (e.g., age, location, etc.), to spoken language (e.g., "cookie" in American English changed to "biscuit" in British English), and the like.

Assigning a variant text composition to a master text composition may optionally include assigning a variant content ID to the master content fragment corresponding to the master text composition. A variant content ID (e.g., a universally unique identifier UUID) identifies a variant text composition with respect to other variant text compositions within content management system 106. In some implementations, variant text compositions are represented similar to master content fragments. In particular, each variant content fragment can correspond to a respective variant text composition with a respective variant content ID. For example, variant content fragment 136 represents variant text composition 148 and has variant content ID 150.

It will be appreciated that other configurations are possible to internally represent master and variant text compositions, as well as to associate variant text compositions with master text compositions. In some cases, variant text compositions (e.g., variant content fragments) are embedded within assigned master content fragments. In others, variant text composition are stored and maintained separately from assigned master text compositions.

Master text compositions may have any number of associated variant text compositions. Users of user devices 102*a* and 102*b* through 102*n* can optionally assign different versions, or variants, of the content to different computing contexts so that when a device requests the content, the appropriate version is automatically selected for transmission to the device (e.g., on a web site). For example, content management system 106 can receive the assignments from the user (e.g., via application 110). Content management system 106 optionally includes content selector 118. When content management system 106 receives a request for particular content (e.g., a master content ID or more generic content ID), such as via interface engine 112, content selector 118 is configured to identify the computing context associated with the request, match the computing context to one of the variant text compositions (or the master text composition) associated with the content ID, and provide the selected text composition for display on the user device (e.g., in an application, on a web page, in an operating system, in an email, in a push notification). Examples of computing context includes any combination of user attributes and device attributes, such as user demographic information, location information, browser information or type, hardware information or type (e.g., a hardware profile), and more.

A content author may wish to make changes to the text of a master text composition. To do so, a user may interact with interface engine 112 (e.g., via application 110) using a word processor application to modify the text of a master text composition. As another example, a premodified version of the text including the changes may be provided by the user to content management system 106. The changes can include, as examples, adding words, characters, or sentences to the text, deleting words, characters, or sentences from the text, replacing words, characters, or sentences in the text, or rearranging words, characters, or sentences in the text.

A modified version of a text composition is referred to herein as a modified text composition. As shown in FIG. 1, storage 130 includes modified master text composition 132, which is a modified master text composition generated from master text composition 142. The user can save (e.g., persist) the changes made to a master text composition to a master content fragment, which results in the modified text composition being used as the master text composition of the master content fragment.

In various implementations, content management system 106 is configured to identify potential changes to one or more variant text compositions of a master text composition based on changes made to a master text composition (i.e., based on a modified master text composition). Further, one or more of the potential changes may be propagated to the one or more variant text compositions. To this effect, content management system 106 includes text processor 114, model generator 116, composition modifier 120, and model analyzer 122.

As an overview, model generator 116 constructs correspondence models between master text compositions, modified master text compositions, and variant text compositions. The correspondence models quantify similarities between text units amongst the text compositions. Using the correspondence models, model analyzer 122 maps text units together amongst the text compositions based on the similarities. The most similar text units can be mapped together between a master text composition and a modified master text compositions in a 1:1 correspondence. The most similar text units can also be mapped together for each variant text composition between the master text composition and the variant text compositions in a 1:1 correspondence. Model analyzer 122 can use these extracted mappings to determine and analyze differences, or changes, between a text unit in the master text composition and the text unit it is mapped to in the modified master text composition. Model analyzer 122 can also analyze the text unit that the text unit of the master text composition is mapped to in a variant text composition to determine potential changes to the variant text unit based on the detected changes. Using this approach, a computing system is capable of propagating changes made to a master text composition to a variant text composition.

As mentioned above, model generator 116 is configured to construct correspondence models between master text compositions, modified master text compositions, and variant text compositions. As shown, storage 130 includes correspondence models, such as correspondence model 140. Each correspondence model can correspond to a respective master text composition, a respective modified master text composition associated with (e.g., generated from or assigned to) the master text composition, and one or more variant text compositions of the master text composition. In various implementations, a correspondence model includes mappings between the modified master text composition, the master text composition, and the one or more variant text compositions thereof (e.g., 1:1 mappings between the text units). As will later be described in additional detail, the mappings can include mappings of text units in the modified master text composition to corresponding text units in the master text composition, and mappings of the corresponding text units in the master text composition to corresponding text units in the one or more variant text compositions.

Model generator 116 generates a correspondence model for a modified master text composition, a master text composition, and one or more variant text compositions using text units of those compositions that are provided by text processor 114. Text processor 114 is configured to divide each of the master text composition, the modified master text composition, and the variant text compositions into text units. As used herein, a text unit refers to one or more characters grouped together using a predetermined grouping algorithm. For a particular correspondence model, each text unit is typically generated using the same predetermined grouping algorithm.

In various implementations, each text unit corresponds to a respective sentence of a text composition. Text processor 114 uses the grouping algorithm to parse each text composition into text units. The set of text units of a single text composition are typically non-overlapping one another and may cover each word (e.g., a sequential grouping of characters uninterrupted by a word terminating delimiter, such as a space or terminating punctuation) or character of the text composition. Any suitable parsing algorithm can be employed to tokenize a text composition.

Text processor 114 provides a set of text units of the master text composition, a set of text units of the modified master text composition, and a set of text units for each variant text composition to model generator 116. Model generator 116 establishes mappings between the text units of the modified master text composition and the text units of the master text composition. Model generator 116 also determines and establishes mappings for each variant text composition between the text units of the master text composition and the text units of the variant text composition. For example, model generator 116 determines and analyzes the similarity of text units across the compositions to establish the mappings.

In various implementations, model generator 116 determines mappings between text compositions by constructing and analyzing a correspondence graph. The correspondence graph uses each text unit from each text composition as a node. For example, the correspondence graph can be a bipartite graph comprising disjoint sets U and V, where set U comprises the text units from one text composition and set V comprises the text units from another text composition.

The correspondence graph includes an edge between each pair of text units from the different text compositions (sets). Thus, Graph G_Variant1 between a master text composition M and one variant text composition V1 comprises an edge between each text unit from M to each text unit from V1. Similarly, Graph G_Master between the master text composition M and the modified master text composition M' comprises an edge between each text unit from M to each text unit from M'.

In constructing the correspondence graphs, model generator 116 weights each edge based on the similarity between the text units (nodes) that correspond to the edge. In various implementations, the weight for an edge corresponds to a similarity level that model generator 116 calculates between the text units. Thus, where each text unit corresponds to a sentence, the similarity level corresponds to a level of similarity between the sentences. In some implementations, the level of similarity between text units is based on comparing words between the text units.

The level of similarity can be determined using an edit distance function that uses the text units as inputs. An edit distance function quantifies how similar two strings are to one another by determining (e.g., counting) the number of operations (e.g., minimum number of operations) required to transform one string into the other. Typical edit distance functions utilize a character as a fundamental unit of the operations. For example, Levenshtein distance operations are the removal, insertion, or substitution of a character in a string. In accordance with implementations of the present disclosure, model generator 116 utilizes multiple characters as the fundamental unit of operations on the edit distance function. For example, model generator 116 can utilize a sentence fragment, such as a phrase, a word, a paragraph, or other grouping of characters (e.g., in sequence), as the fundamental unit. Thus, the edit distance function can comprise the operations of adding a word, deleting a word, and changing (updating) a word.

In determining a level of similarity, the costs of each operation may be normalized (e.g., to a value between 0 and 1), if needed, and combined (e.g., added) to result in a total cost. The total cost can be normalized by the length of the longest text unit (e.g., by the number of words in the text unit, also potentially to a value between 0 and 1). The level of similarity may then be calculated using the equation: 1−(normalized total cost).

As described above, model generator 116 can determine the level of similarity between text units based on the similarity of words between the text units. Model generator 116 may factor in the similarity between the characters of the words (e.g., whether they are the same of different). In addition, or instead, model generator 116 may factor in the similarity between meanings of the words (e.g., more similar words result in more similar text units). The similarity of word meanings can be quantified by analyzing the words in a WordNet, which corresponds to a lexical database. For example, synonyms may be determined as more similar in meaning than non-synonyms. In some cases, the similarity in meaning is determined using Word2vec models. Thus, in various implementations, the level of similarity between text units can be based on the semantic similarity between the text units.

When implementing an edit distance function to determine similarity, the cost of replacing a word can be based on the word that is replaced. For example, the cost can be used to factor in the similarity in meanings between the words (or other fundamental unit). As an example, changing a word from one form to another typically would have a low cost. Changing "great" to "brilliant" would have a low cost, but changing "great" to "terrible" would have a high cost.

Also in some implementations, the similarity between text units can be based on a linguistic significance of words in the text units. For example, when factoring in a removal or addition of a word between text units, the text units are determined as more similar when the word has a relatively low linguistic significance, or value, than a high linguistic significance. When implementing an edit distance function to determine similarity, the cost of removal or addition of a word can be based on the words linguistic significance. Linguistic significance of a word can be determined, for example, based on how common or frequent the word is in one or more reference compositions (e.g., the current composition and/or a text corpus). In some cases, the linguistic significance could be preassigned based on the specific word or category of word (e.g., part of speech). As an example, articles could have lower significance than nouns. Text units may be parsed using part-of-speech tagging, and the part-of-speech of the word can be utilized to determine the cost, as an example.

Model analyzer 122 uses the correspondence models to map text units together amongst the text compositions based on the similarities. For example, mappings 152 can be extracted from correspondence model 140 (e.g., from graphs 154). Each text unit in a master text composition may be mapped to a text unit in a modified text composition using a 1:1 correspondence between the graphs. Similarity, each text unit in the master text composition may be mapped to a text unit in a variant text composition using a 1:1 correspondence between the graphs. The mapping can optionally use threshold-based matching between the bipartite graphs. In other words, for a text unit to be mapped to another text unit may require the level of similarity between the text units to satisfy a threshold. A suitable threshold for the level of similarity could be, for example, 0.5-0.6 on a scale from 0-1. Typically each text unit is mapped to the text unit that has the highest level of similarity.

In some implementations, the correspondence models comprise text unit orderings within the text compositions. The text unit orderings of a text composition capture the text unit's relative position within the text composition relative to other text units. For example, each text unit could be assigned a number that indicates its position in the text composition. Using a graph based approach, the node in the graph that represents the text unit can comprise the number. For example, node 1 could represent the first sentence in a 10 sentence text composition and node 10 could represent the last sentence in the text composition. Model generator 116 may use a similar ordering algorithm for each text composition.

In some cases, when extracting mappings, model analyzer 122 factors in the ordering of text units when matching the text units between text compositions. For example, model analyzer 122 may favor matching to text units that have more similar orderings in their text compositions. As an example, assume that a text unit from one text composition has an identical level of similarity (e.g., similarity score) with two text units in another text composition. Model analyzer 122 may map the text unit to the text unit that is closest to its own ordering (e.g., in the same ordering, or position) within its text composition.

Composition modifier 120 uses the extracted mappings to determine and analyze differences, or changes, between the master text composition and the modified master text composition. In some implementations, composition modifier 120 can determine that a text unit has not changed between the master text composition and the modified master text composition. Composition modifier 120 may make such a determination based on the level of similarity (e.g., edge weight), or similarity score between the text units from the text composition. The similarity score may be at its maximum value when no change has occurred. For example on the 0-1 scale, a 1 could indicate that no change has occurred.

Where a change has occurred between text units, in some implementations, composition modifier 120 refrains from analyzing and identifying differences between the text units based on the similarity score being below a threshold value (or at least refrains from presenting proposed changes to the user, if generated). For example, the threshold value could be 0.5-0.6, or based on the standard deviation in similarity score amongst the text units of the text compositions. This can filter out at least some of the text unit pairs from analysis, which reduces processing time and improves computing performance. These filtered text unit pairs are sufficiently dissimilar that analyzing them to identify specific differences, or deltas, may be of little value.

Where text units are not identical, composition modifier 120 may analyze and identify differences between the text units, optionally based on the similarity score being above a threshold value (e.g., 0.5-0.6 or based on the standard deviation). Where a threshold is used, the text unit pairs are sufficiently similar that analyzing them to identify specific differences, or deltas, is likely to produce quality output that is useful to users. As with any threshold descried herein, the value may be machine learned and/or adaptive.

In some cases, composition modifier 120 identifies categories of differences between the text units. Examples of categories of differences include adding a text unit to a text composition, removing a text unit from a text composition, replacing a text unit in a text composition, and reordering a text unit in a text composition. At least some differences may be detected by comparing words between documents, such as using "difflib." Further analysis may be required to categorize the differences.

In some cases, composition modifier 120 detects a reordering of a text unit in a text composition by comparing the order of the text unit in the master text composition to the order of the text unit in the modified master text composition. For example, as described above, the orderings may be captured by the nodes in the correspondence graphs. Thus, for example, non-matching orderings between text units may indicate that a text unit from the master text composition has moved, or been reordered.

Composition modifier 120 can determine proposed changes to a text unit in a variant text composition based on the detected change between the master text composition and the modified master text composition. In some cases, composition modifier 120 generates the proposed changes based on the detected category of the change. For example, each category may correspond to a different function for generating a proposed change.

Where composition modifier 120 determines a deletion (of at least one word and/or character) has occurred between a master text composition and a modified master text composition, composition modifier 120 may search for the deleted word (or at least one word and/or character) in the text unit of the variant text composition and propose deleting that word. Where multiple instances of the word are present in the variant text composition, composition modifier 120 may further compare the environment of words in the variant text composition to the environment of the deleted word in the master text composition. The environment can include, for example, one or more words preceding, following, and or surrounding the words (e.g., a fixed number of words before and after the word, if present).

Where composition modifier 120 determines an addition (of one or more words and/or characters) has occurred between a master text composition and a modified master text composition, composition modifier 120 may search for a position for the added word (or one or more words and/or characters) in the text unit of the variant text composition and propose adding that word at that position. In some cases, this includes composition modifier 120 comparing the words in the variant text composition to the environment of the added word in the modified master text composition. The environment can include, for example, one or more words preceding, following, and or surrounding the added word (e.g., a fixed number of words before and after the word, if present). Where one or more words can be matched to the environment, composition modifier 120 can map the position of the added word in the environment to a position relative to the matched words (e.g., within the matched words).

Where composition modifier 120 determines a replacement (of one or more words and/or characters) has occurred between a master text composition and a modified master text composition, composition modifier 120 may search for the replaced word (or one or more words and/or characters) in the text unit of the variant text composition and propose replacing the word. Similar to a deletion, where multiple instances of the word are present in the variant text composition, composition modifier 120 may further compare the environment of words in the variant text composition to the environment of the replaced word in the master and/or modified master text composition. The environment can include, for example, one or more words preceding, following, and or surrounding the words (e.g., a fixed number of words before and after the word, if present).

Where composition modifier 120 determines a reordering a text unit has occurred between a master text composition and a modified master text composition, composition modifier 120 may search for a new ordering for the corresponding text unit of the variant text composition and propose a movement of the text unit. In some cases, composition modifier 120 compares the environment of text units in the variant text composition to the environment of the reordered text unit in the master and/or modified master text composition. The environment can include, for example, one or more text units preceding, following, and or surrounding the text unit (e.g., a fixed number of text units before and after the text unit, if present).

Having determined proposed or potential changes for a text unit of a variant text composition based on a detected change to a corresponding text unit on the master text composition, one or more of the proposed changes can be applied to the variant text composition. In some cases, one or more of the proposed changes are automatically applied to the variant text composition. The text of the variant text composition is modified to include potential changes and persistently stored in the variant text composition (e.g., in the variant content fragment). In implementations where proposed changes are automatically applied, in some cases, a proposed change is automatically applied based on a categorization of the change, and other proposed changes may require a user to accept the change. For example, composition modifier 120 may automatically apply a change of one word to a synonym, to a change in tense, or otherwise to a related word. As another example, composition modifier 120 may solicit user acceptance of a change based on detecting that the change corresponds to pricing information. This can include detecting a monetary indicator in the text unit, such as a dollar sign, or other currency sign or character.

Also having determined proposed or potential changes for a text unit of a variant text composition, the proposed changes may be presented to a user. For example, interface engine 112 can present one or more proposed changes to the user. This can include transmitting the potential changes and/or a modified variant text composition that include one or more potential changes to a user device (e.g., to application 110).

The potential changes may be displayed to the user on a user device (e.g., in application 110). FIGS. 2A and 2B show examples of a display to the user. In particular, FIG. 2A shows one example of a master text composition, modified master text composition, and variant text composition, along with proposed changes to the variant text composition in accordance with embodiments of the present disclosure. FIG. 2B shows another example of a master text composition, modified master text composition, and variant text composition, along with proposed changes to the variant text composition in accordance with embodiments of the present disclosure.

Display 200A in FIG. 2A displays columns of computer text of the text compositions. In respective columns display 200A comprises master text composition 242A, variant text composition 248A, and modified master text composition 232A, which can correspond to master text composition 142, variant text composition 148, and modified master text composition 132 of FIG. 1. Display 200A also includes proposed changes 260A comprising one or more proposed changes determined by composition modifier 120. Similarly, in respective columns display 200B comprises master text composition 242B, variant text composition 248B, and modified master text composition 232B, which as another example can correspond to master text composition 142, variant text composition 148, and modified master text composition 132 of FIG. 1. Display 200B also includes proposed changes 260B comprising one or more proposed changes determined by composition modifier 120. Any combination of the information shown may be displayed to the user, either simultaneously, as shown, or at different times and in different formats.

As shown in FIGS. 2A and 2B, the displays can optionally visually indicate one or more text units in the master text composition where model analyzer 122 has detected a change between the master text composition and the modified master text composition. For example, display 200A includes visual indicator 262 for one text unit and visual indicator 264 for another text unit based on having detected changes in those text units (e.g., sentences). Display 200A can indicate one or more text units that have a detected change in any suitable manner In some cases, those text units are highlighted (e.g., completely) within the text composition. Similarly, display 200B comprises visual indicator 266 of detected changes to multiple consecutive text units. The display also indicates when text units do not include any detected changes.

As shown in FIGS. 2A and 2B, the displays can also optionally visually indicate one or more detected changes within text units of a master text composition. Visual indicators 262, 264, and 266 do not visually distinguish what in particular has changed within a text unit. Instead, these indicators highlight complete text units based on one or more changes being detected. In contrast, visual indicators 268, 270, and 272 correspond to and visually identify particular changes detected within a master text composition. Each change may have a separate visual indicator.

As shown, visual indicator 268, for example, corresponds to a detected a replacement corresponding to pricing information. Model analyzer 122 has detected that "$19.99/month" has been changed to "$29.99/month." Visual indicator 270 corresponds to a detected deletion, or removal. Model analyzer 122 has detected that "for first time membership" has been deleted. In the present example, visual indicator 270 corresponds to at least part of an environment of the deleted characters, or words, of the master text composition. In some cases, a similar visual indicator could be displayed in-line with the master text composition. For example, the deleted words and/or characters may be highlighted therein.

In is also noted that while visual indicator 262 is displayed with respect to master text composition 242A, in some cases, a visual indicator similar to visual indicator 262 could in addition, or instead be displayed with respect to modified master text composition 232A. Similarly, while visual indicator 268 is displayed with respect to modified master text composition 232A, in some cases, a visual indicator similar to visual indicator 268 could in addition, or instead, be displayed with respect to modified master text composition 242A. Also, while each change is indicated simultaneously, as indicated above, in some cases only one may be displayed or indicated at a time. As one example, a user could step through the changes that are displayed (e.g., using forwards and backwards buttons).

As shown in FIGS. 2A and 2B, the displays can also optionally visually indicate one or more proposed changes within text units of a variant text composition. Visual indicators 280, 282, 284, 286, and 288 correspond to and visually identify particular proposed changes detected within variant text compositions. Each proposed change may have a separate visual indicator. In some cases, the visual indicator also visually indicates the type or category of change to the user. In the examples shown, visual indicator 280 indicates a replacement, or update, visual indicator 282 indicates a deletion, or removal, visual indicator 284 indicates both a replacement and removal, visual indicator 286 indicates a removal, and visual indicator 288 indicates a removal. The present examples indicate the change types using tags, as examples. A text unit reordering can similarly include a tag or indicator, or could be indicated by position the proposed change is displayed with respect to other text units in the text composition. As shown, similar to detected changes, the proposed changes are indicated in-line with the text compositions.

A user (e.g., of application 110) can optionally individually accept or reject one or more of the proposed changes displayed in display 200A, 200B, or another suitable display in order to adopt the changes in the variant text composition. When a user adopts a change, the change may be reflected in the display (e.g., in the proposed changes column). Composition modifier 120 can persist the adopted changes to the variant text compositions and optionally the variant content fragments. Persisting as used herein can refer to persistently storing, such as in non-volatile memory. When a subsequent change is made to a master text composition, for example, variant text composition 248A would include the adopted changes and be utilized to determine new proposed changes.

While display 200A and display 200B are separately shown, in some implementations, the displays and/or any of the information therein may be part of a common user interface. For example, content management system 106 may process all of the variant text compositions and subsequently present them all (or a subset thereof such as only those that include at least one proposed change) in the same interface where the user can adopt, reject, and/or view changes or proposed changes made to the variant text compositions.

Also, as described above, where a change has occurred between text units, in some implementations, composition modifier 120 refrains from analyzing and identifying differences between the text units based on the similarity score being below a threshold value. In addition, or instead, composition modifier 120 refrains from presenting proposed changes to the user. However, based on this determination, composition modifier 120 may still indicate a detected change to the user, such as by highlighting the detected change or the text unit that was changed (in the master or the modified master).

Figure 3:
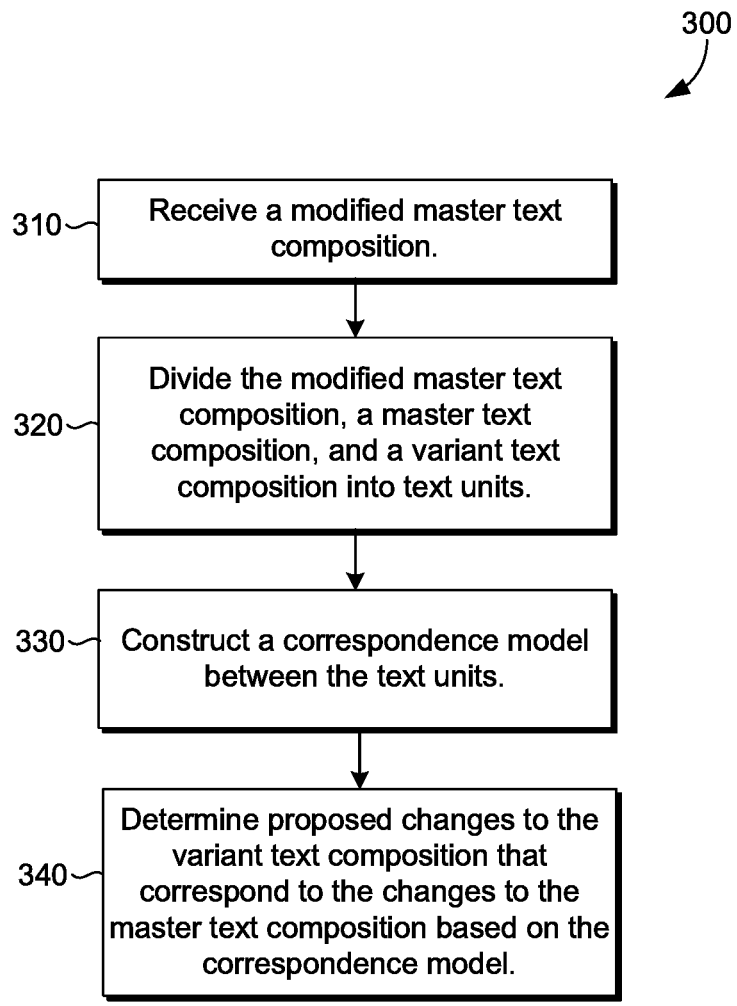
FIG. 3 is a flow diagram showing a method for propagating changes in master content to variant content in accordance with embodiments of the present disclosure.

Referring now to FIG. 3, a flow diagram is provided showing one embodiment of a method 300 for propagating changes in master content to variant content. At block 310, method 300 includes receiving a modified master text composition. For example, interface engine 112 can receive, from a user interface, modified master text composition 132 that incorporates changes to master text composition 142. Various approaches for receiving the modified master text composition have been described above (e.g., from a word processing application).

At block 320, method 300 includes dividing the modified master text composition, a master text composition, and a variant text composition into text units. For example, text processor 114 can divide modified master text composition 132, master text composition 142, and variant text composition 148 into text units. Thus, where the text compositions correspond to the text compositions of FIG. 2A, modified master text composition 132 can have seven text units, master text composition 142 can have seven text units, and variant text composition 148 can have two text units, each having one text unit per sentence.

At block 330, method 300 includes constructing a correspondence model between the text units. For example, model generator 116 can construct correspondence model 140 from the text units extracted by text processor 114. As described above, correspondence model 140 can generate a correspondence graph between text units of modified master text composition 132 and master text composition 142. Correspondence model 140 can also generate a correspondence graph between text units of master text composition 142 and variant text composition 148. The graphs can be bipartite graphs and each node can correspond to a single text unit. The ordering assigned to the nodes can be based on the orderings in the text compositions. Thus, the text unit corresponding to the first sentence in master text composition 242A could be node one, the text unit corresponding to the second sentence in master text composition 242A could be node two, and so on. Similarly, the text unit corresponding to the first sentence in modified master text composition 232A could be node one, the text unit corresponding to the second sentence in modified master text composition 232A could be node two, and so on. Similarity scores are generated and used as the weighted edges of the graphs, as described above.

At block 340, method 300 includes determining proposed changes to the variant text composition that correspond to changes to the master text composition based on the correspondence mode. For example, model analyzer 122 can detect the changes to the master text composition, and composition modifier 120 can generate proposed changes to the text units in the variant text composition that correspond to the detected changes as indicated by the mappings. Composition modifier 120 can integrate at least one of the proposed changes into variant text composition 148, as shown in FIG. 2A. A user may accept or reject proposed changes and persist a modified version of variant text composition 148 to variant content fragment 136, such that the modified version is now associated with master text composition 142 in place of variant text composition 148.

Figure 4:
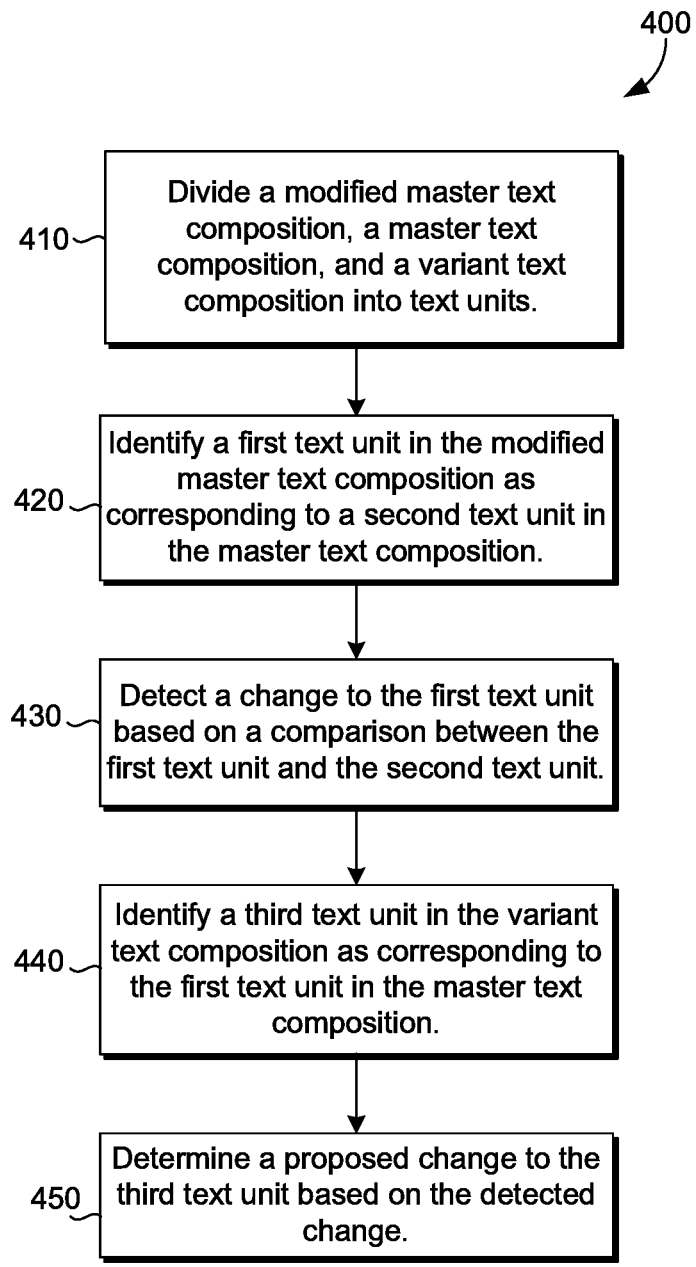
FIG. 4 is a flow diagram showing a method for propagating changes in master content to variant content in accordance with embodiments of the present disclosure.

Referring now to FIG. 4, a flow diagram is provided showing one embodiment of a method 400 for propagating changes in master content to variant content. At block 410, method 400 includes dividing a modified master text composition, a master text composition, and a variant text composition into text units. For example, text processor 114 can divide master text composition 142, modified master text composition 132, and variant text composition 148 into text units.

At block 420, method 400 includes identifying a first text unit in the modified master text composition as corresponding to a second text unit in the master text composition. For example, assuming that the text compositions correspond to those shown in FIG. 2A, model analyzer 122 may determine that the first sentence of master text composition 242A corresponds to the first sentence of modified master text composition 232A. The determination can be made based on a similarity score between the two text units (e.g., in correspondence model 140). Examples of determining similarity scores have been described above. This determination may correspond to extracting one or mappings 152 from correspondence model 140.

At block 430, method 400 includes detecting a change to the first text unit based on a comparison between the first text unit and the second text unit. For example, composition modifier 120 can detect a change based on the similarity score, which was generated based on a comparison between the text units. In some implementations, composition modifier 120 determines that a change has occurred based on the similarity score being below a maximum possible value for the score, or other another threshold value.

At block 440, method 400 includes identifying a third text unit in the variant text composition as corresponding to the first text unit in the master text composition. For example, assuming that the text compositions correspond to those shown in FIG. 2A, model analyzer 122 may determine that the first sentence of master text composition 242A corresponds to the first sentence of variant text composition 248A. The determination can be made based on a similarity score between the two text units (e.g., in correspondence model 140). This determination may correspond to extracting one or mappings 152 from correspondence model 140.

At block 450, method 400 includes determining a proposed change to the third text unit based on the detected change. For example, composition modifier 120 can determine the proposed changes corresponding to visual indicator 284 in response to having detected the change to the corresponding text unit in master text composition 242B and indicated by visual indicators 272 and 266.

Figure 5:
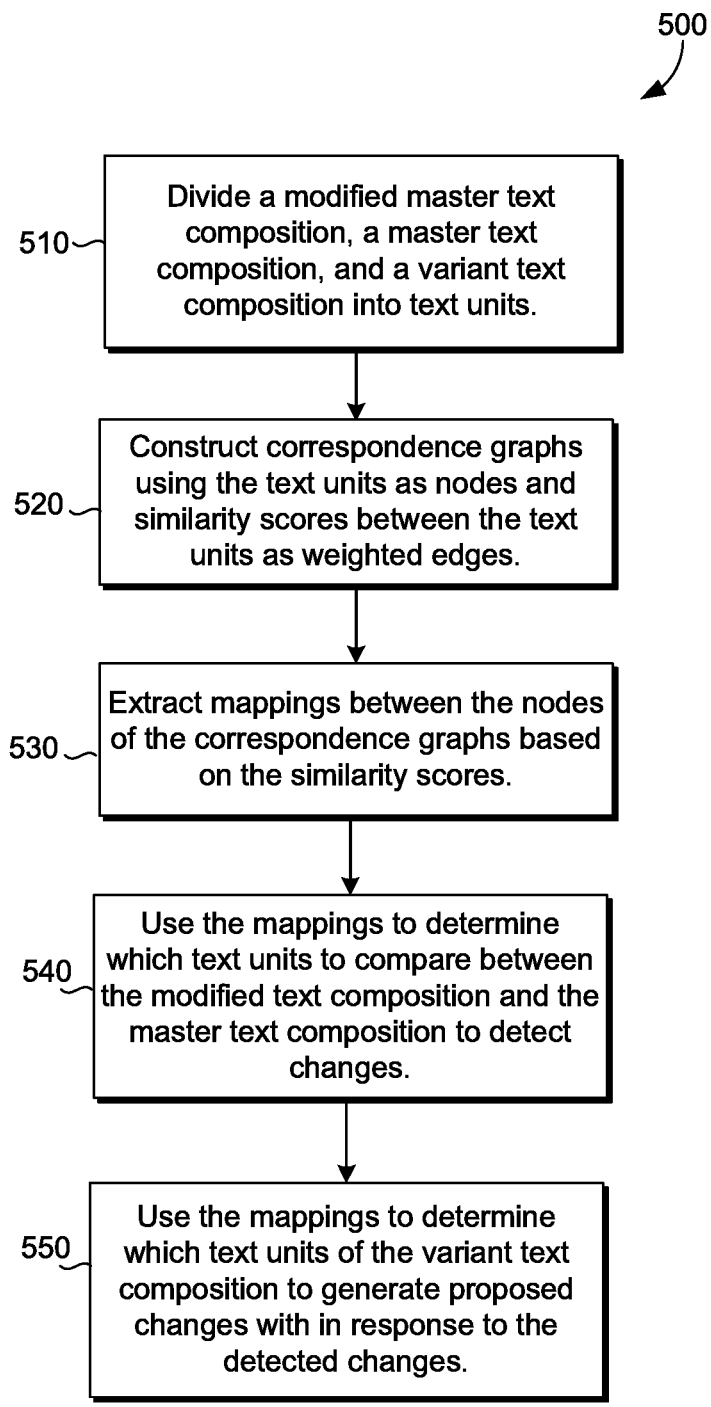
FIG. 5 is a flow diagram showing a method for propagating changes in master content to variant content in accordance with embodiments of the present disclosure.

Referring now to FIG. 5, a flow diagram is provided showing one embodiment of a method 500 for propagating changes in master content to variant content. At block 510, method 500 includes dividing a modified master text composition, a master text composition, and a variant text composition into text units. For example, text processor 114 can divide master text composition 142, modified master text composition 132, and variant text composition 148 into text units.

At block 520, method 500 includes constructing correspondence graphs using the text units as nodes and similarity scores between the text units as weighted edges. For example, model generator 116 can construct a correspondence graph between master text composition 142 and variant text composition 148 and a correspondence graph between master text composition 142 and modified master text composition 132.

At block 530, method 500 includes extracting mappings between the nodes of the correspondence graphs based on the similarity scores. For example, assuming that the text compositions correspond to those shown in FIG. 2A, model analyzer 122 may extract a mapping from the text unit corresponding to the first sentence of master text composition 242A to the text unit corresponding to the first sentence of modified master text composition 232A. Model analyzer 122 may also extract a mapping from the text unit corresponding to the first sentence of master text composition 242A to the text unit corresponding to the first sentence of variant text composition 248A. The mappings can be extracted using a 1:1 correspondence between text units amongst the text compositions. Further, each text unit may be similarly mapped is a corresponding text unit can be identified.

At block 540, method 500 includes using the mappings to determine which text units to compare between the modified text composition and the master text composition to detect changes. For example, composition modifier 120 can analyze the similarity score between the text units corresponding to the first sentences of master text composition 242A and modified master text composition 232A, or can categorize and/or analyze the changes based on those text units being mapped together. Similar analysis can be performed on other text units that are mapped together.

At block 550, method 500 includes using the mappings to determine which text units of the variant text composition to generate proposed changes with in response to the detected changes. For example, composition modifier 120 can analyze the text unit corresponding to the first sentence of variant text composition 248A and generate proposed changes based on having detected a change to the text unit of master text composition 242A that it is mapped to. Similar proposed change generation and analysis can be performed on other text units that are mapped together. By indicating which text units correspond to one another, the text units can be analyzed in a manner that utilizes low computing resources, as text units between the text compositions that are dissimilar need not be compared.

Figure 6:
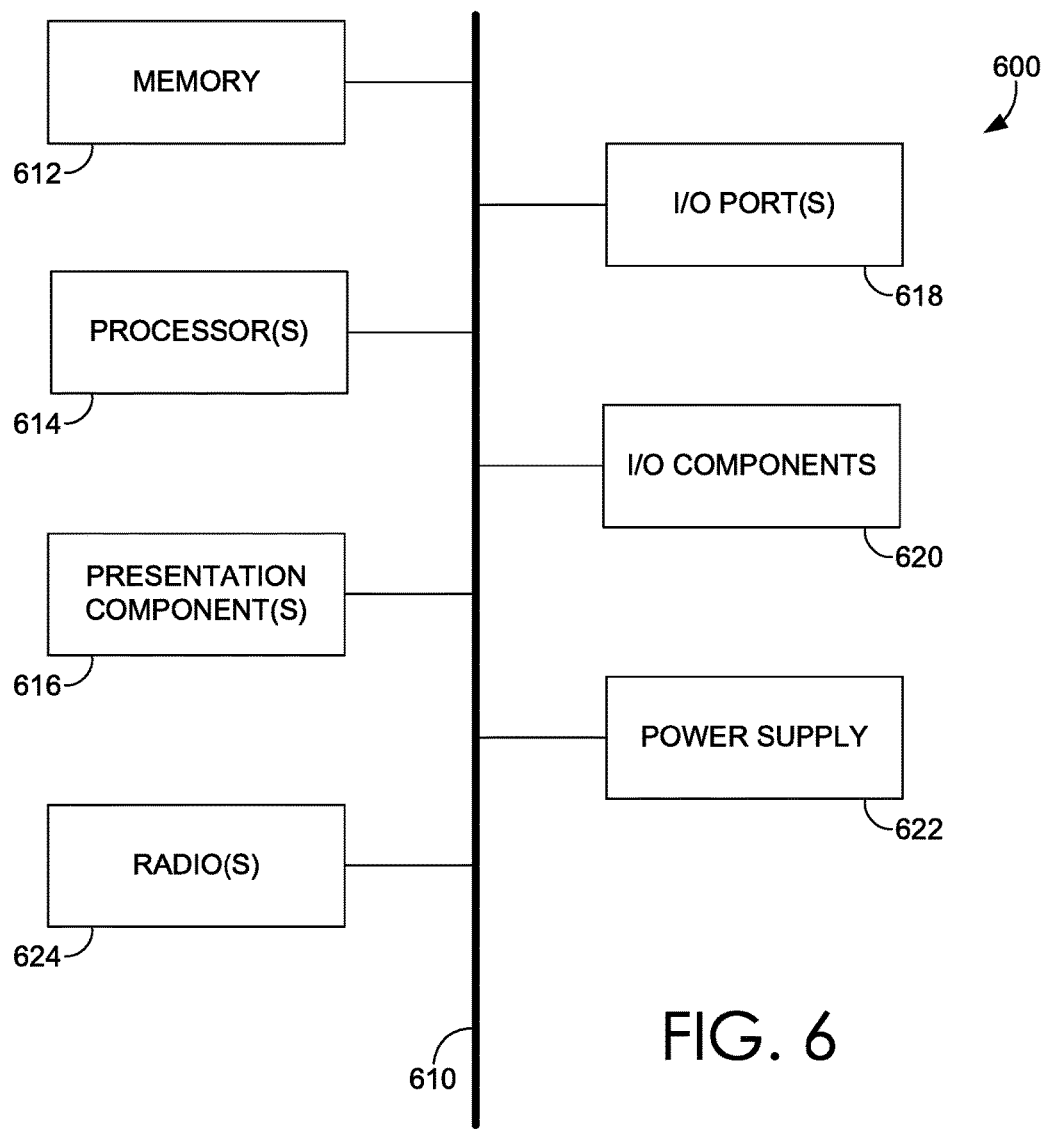
FIG. 6 is a block diagram of an exemplary computing environment suitable for use in implementations of the present disclosure.

With reference to FIG. 6, computing device 600 includes bus 610 that directly or indirectly couples the following devices: memory 612, one or more processors 614, one or more presentation components 616, input/output (I/O) ports 618, input/output components 620, and illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art and reiterate that the diagram of FIG. 6 is merely illustrative of an exemplary computing device that can be used in connection with one or more embodiments of the present invention. Distinction is not made between such categories as "workstation," "server," "laptop," "handheld device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 612 includes computer-storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as stereoscopic camera systems, infrared camera systems, RGB camera systems, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

The present invention has been described in relation to particular embodiments, which are intended in all respects to be illustrative rather than restrictive. Alternative embodiments will become apparent to those of ordinary skill in the art to which the present invention pertains without departing from its scope.

Many different arrangements of the various components depicted, as well as components not shown, are possible without departing from the scope of the claims below. Embodiments of the present invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A computer-implemented method comprising:
   receiving, from a user interface, a modified master text composition comprising a first sequence of text that includes a modification to a second sequence of text of a master text composition, wherein a variant text composition is maintained as a variant of the master text composition, the variant text composition comprising a third sequence of text comprising a variation to the second sequence of text;
   dividing the first sequence of text into a first set of text units each text unit comprising a different portion of the text of the first sequence, dividing the second sequence of text into a second set of text units each text unit comprising a different portion of the text of the second sequence, and dividing the third sequence of text into a third set of text units each text unit comprising a different portion of the text of the third sequence;

constructing a correspondence model between the first set of text units, the second set of text units, and the third set of text units, the correspondence model comprising a first mapping of the first set of text units to the second set of text units, a second mapping of the first set of text units to the third set of text units, and a third mapping of the second set of text units to the third set of text units;

based on the correspondence model, determining a proposed modification to the third sequence of text based on the first mapping and the second mapping, the proposed modification corresponding to the modification to the second sequence of text; and integrating the proposed modification into the third sequence of text of the variant text composition while preserving the variation based on the third mapping.

2. The computer-implemented method of claim 1, wherein said integrating comprises generating a modified variant text composition that includes the proposed change, and the method further comprises:

storing the modified variant text composition in a variant content fragment; and replacing the master text composition stored in a master content fragment with the modified master text composition in response to the receiving of the modified master text composition.

3. The computer-implemented method of claim 1, wherein a plurality of the text units each comprise a sequence of words.

4. The computer-implemented method of claim 1, wherein the constructing the correspondence model further comprises:

determining a first similarity score between the first set of text units and the third set of text units based on the second mapping; and determining a second similarity score between the first set of text units and the second set of text units based on the first mapping.

5. The computer-implemented method of claim 1, wherein the constructing the correspondence model comprises:

identifying a deletion of a word between the third set of text units and the first set of text units; and determining a similarity score between the first set of text units and the third set of text units based on a cost associated with the deletion of the word.

6. The computer-implemented method of claim 1, wherein the constructing the correspondence model comprises:

identifying a replacement of a first word with a second word between the third set of text units and the first set of text units;

receiving a cost associated with the replacement of the first word with the second word, the cost being based on a level of semantic similarity between the first word and the second word; and determining a similarity score between the first set of text units and the third set of text units using the cost.

7. The computer-implemented method of claim 1, wherein the determining the proposed modification comprises:

identifying that the modification has occurred between the first set of text units and the second set of text units using a similarity score between the first set of text units and the second set of text units in the correspondence model;

after the identifying that the modification has occurred, selecting a category of the modification from a plurality of categories based on an analysis of the first set of text units and the second set of text units; and generating the proposed modification based on the category of the modification.

8. The computer-implemented method of claim 1, wherein the determining the proposed modification comprises:

identifying a deletion of a word between the second set of text units and the first set of text units;

selecting surrounding characters of the word in the master text composition based on the identifying of the deletion of the word; and determining a position of the proposed modification in the third set of text units based on a comparison between the surrounding characters to characters in the third set of text units.

9. The computer-implemented method of claim 1, further comprising extracting the first mapping from the correspondence model based on a level of a similarity score between the first set of text units and the second set of text units in the correspondence model.

10. The computer-implemented method of claim 1, wherein the determining the proposed modification comprises identifying a reordering of the first set of text units of the master text composition in the modified master text composition.

11. A computer-implemented system comprising:

at least one processor; and computer storage media storing computer-useable instructions that, when executed by the at least one processor, cause the at least one processor to perform operations comprising:

receiving, from a user interface, a modified master text composition comprising a first sequence of text that incorporates a modification to a second sequence of text of a master text composition, wherein a variant text composition is maintained as a variant of the master text composition, the variant text composition comprising a third sequence of text comprising a variation to the second sequence of text, wherein the variant text comprises a summary, adaptation, truncation, or rearrangement of the master text composition;

dividing the first sequence of text into a first set of text units each text unit comprising a different portion of the text of the first sequence, dividing the second sequence of text into a second set of text units each text unit comprising a different portion of the text of the second sequence, and dividing the third sequence of text into a third set of text units each text unit comprising a different portion of the text of the third sequence;

constructing a correspondence model between the first set of text units, the second set of text units, and the third set of text units, the correspondence model comprising a first bipartite graph of similarity scores between each text unit of the first set of text units and each text unit of the second set of text units a second bipartite graph of similarity scores between each text unit of the first set of text units and each text unit of the third set of text units, and a third bipartite graph of similarity scores between each text unit of the second set of text units and each text unit of the third set of text units;

based on analyzing the first bipartite graph, the second bipartite graph, and the third bipartite graph, determining a first mapping of a first text unit of the text units of the first sequence of text to a second text unit of the text units of the second sequence of text and a second mapping of a third text unit of the text units of the third sequence of text to the first text unit of the text units of the first sequence of text;

determining a proposed modification to the third sequence of text based on the first mapping and the second mapping, the proposed modification corresponding to the modification to the second sequence of text; and integrating the proposed modification into the third sequence of text of the variant text composition while preserving the variation.

12. The computer-implemented system of claim 11, wherein the first set of text units, the second set of text units, and the third set of text units each comprise a sequence of words.

13. The computer-implemented system of claim 11, wherein the variant text comprises a summary, adaptation, truncation, or rearrangement of the master text composition.

14. The computer-implemented system of claim 11, wherein the constructing the correspondence model comprises:

identifying a deletion of a word between the third set of text units of the variant text composition and the first set of text units of the master text composition; and determining a similarity score between the first set of text units and the third set of text units based on a cost associated with the deletion of the word.

15. The computer-implemented system of claim 11, wherein the constructing the correspondence model comprises:

identifying a replacement of a first word with a second word between the second set of text units of the modified master text composition and the first set of text units of the master text composition;

receiving a cost associated with the replacement of the first word with the second word, the cost being based on a level of semantic similarity between the first word and the second word; and determining a similarity score between the first set of text units and the second set of text units using the cost.

16. At least one computer storage device storing computer-useable instructions that, when used by the at least one computing device, cause the at least one computing device to perform a method comprising:

receiving user input that provides a modified master text composition in association with a master content fragment, the modified master text composition comprising a first sequence of text incorporating a modification to a second sequence of text of a master text composition in the master content fragment, wherein a variant text composition is maintained as a variant of the master text composition in a variant content fragment, the variant text composition comprising a third sequence of text comprising a variation to the second sequence of text, wherein the variant text comprises a summary, adaptation, truncation, or rearrangement of the master text composition;

dividing the first sequence of text into a first set of text units each text unit comprising a different portion of the text of the first sequence, dividing the second sequence of text into a second set of text units each text unit comprising a different portion of the text of the second sequence, and dividing the third sequence of text into a third set of text units each text unit comprising a different portion of the text of the third sequence;

constructing a correspondence model between the first set of text units, the second set of text units, and the third set of text units, the correspondence model comprising a first similarity score between the first set of text units and the second set of text units, and a second similarity score between the first set of text units and the third set of text units;

extracting a first mapping between the first set of text units and the second set of text units from the correspondence model based on the first similarity score, and extracting a second mapping between the third set of text units and the first set of text units from the correspondence model based on the second similarity score;

determining a proposed modification to a particular text unit of the third set of text units that corresponds to the modification to the second set of text units based on the first mapping and the second mapping;

displaying text of the particular text unit of the third set of text units with a visual indication of the proposed modification in a user interface on a user device associated with the user input; and updating the third set of text units in the variant content fragment with a modified version of the third set of text units that incorporates the proposed modification in response to a user selection in the user interface of an option to accept the proposed modification.

17. The computer storage device of claim 16, wherein the method further comprises displaying the master text composition to the user, and the receiving of the modified master text composition comprises receiving the modification made by the user to the displayed master text composition.

18. The computer storage device of claim 16, wherein the method further comprises receiving a user selection in the user interface of an option to decline a designated proposed modification, the modified variant text composition excluding the designated proposed modification based on the user selection in the user interface of the option to decline the designated the proposed modification.

19. The computer storage device of claim 16, wherein the visual indication comprises text displayed in-line with the text of the particular text unit of the variant text composition.

20. The computer storage device of claim 16, wherein the user interface concurrently presents the first set of text units, the second set of text units, and the third set of text units during the displaying of the text of the particular text unit of the variant text composition.

* * * * *